3,405,217
METHOD FOR MAKING OPEN CELL POLYURETHANE FOAMS

Walter L. Garrett, Freeland, and Harold H. Roth, Bay City, Mich., assignors to The Dow Chemical Company, Midland, Mich., a corporation of Delaware
No Drawing. Filed Mar. 30, 1964, Ser. No. 355,950
8 Claims. (Cl. 264—321)

This invention relates to the preparation of low density flexible polyurethane foams and pertains especially to a method for making open cell flexible polyurethane foam suitable for use as filters for fluids to remove solid material entrained therein. The invention also relates to soft, low density, fine cell, low compression load, foams.

It is known to modify or chang the physical properties of open-cell, cellular structures of foamed polymeric polyester polyurethanes by the partial saponification of the foam with hydrolytic saponification reagents and under conditions commonly used for hyrolyzing carboxylic esters in general, to convert the polyurethane foam from a relatively hard cellular structure to a foam of increased softness, capillary activity, hydrophilicity and of decreased density.

It is also known to violently agitate a sheet of polyurethane foam by mechanical means to increase the number of interconnecting cells or voids, or to crush the dry foam by alternate squeezing and expanding action to rupture the cell walls or membranes, leaving principally the skeletal structure, and form a product suitable for use as a filter for fluids.

It has now been discovered that flexible polyether polyurethane open cell foams can readily be converted to foams of greater porosity or of improved breathability, together with increased softness, by treating the foam with an aqueous basic solution of an alkali metal hypohalite of an alkaline earth metal hypohalite, as hereinafter defined, whereby the membranes of the cells, being of relatively thinner section, are preferentially destroyed, leaving largely a skeletal network of the foam structure, to produce polyether polyurethane foam products of high porosity, and useful for a variety of purposes in the home and industry, e.g. as filters for fluids to remove solid materials entrained therein.

The polyether polyurethane foam or sponge starting material can be any open-cell flexible polyether urethane sponge formed by reaction of a polyether polyol having an OH equivalent weight between about 600 and 1800, with a polyisocyanate. Methods of making flexible open cell urethane foams are well known and need not be discussed in detail. The urethane foam starting material is preferably a flexible open-cell polyoxyalkylene glycol ether polyol-polyisocyanate reaction product.

Among suitable polyols are the polypropylene glycols and adducts of polyhydric compounds such as glycerine, sorbitol, pentaerythritol or hexane triol with propylene oxide, or with a mixture of propylene and ethylene oxides, which polygylcols and polyether polyols have a molecular weight within the range of from about 1800 to 5800.

Among suitable polyisocyanates that can be used to make the polyurethane foams there may be mentioned 2,4-toluene diisocyanate, 2,6-toluene diisocyanate, metaphenylene diisocyanate, 1-chlorophenylene-2,4-diisocyanate, naphthalene-1,5-diisocyanate, hexamethylene diisocyanate, polymethylene polyphenyl isocyanate having an NCO content of about 31 percent by weight, or mixtures of any two or more of the polyisocyanates.

A general method of making the urethane foam is by reaction of a polyisocyanate with a polyol to produce a prepolymer. The prepolymer is then foamed by reaction with water and an amine catalyst. The urethane foam can be produced by the so-called one-step process wherein the polyisocyanate, the polyol, catalyst, and a silicone fluid, and water, or water and a volatile alkane, or haloalkane, foaming agent, are blended together in a mixing chamber in the desired proportions, under pressure, then are discharged and allowed to foam to a flexible resilient open-cell product.

The flexible foam product is leached or treated by contacting it with an aqueous basic solution of an alkali metal or an alkaline earth metal hypohalite to destroy the membranes of the cells leaving a skeletal network of the foam product that has increased softness, flexibility, resiliency and porosity.

Among suitable inorganic hypohalites are sodium hypochlorite, potassium hypochlorite, lithium hypochlorite, sodium hypobromite, potassium hypobromite, lithium hypobromite, calcium hypochlorite, calcium hypobromite, magnesium hypochlorite, magnesium hypobromite, barium hypobromite, barium hypochlorite and strontium hypochlorite. The hypohalites are employed in a basic aqueous solution having a pH of 10 or greater, preferably, a pH of 12 or above. The pH of the aqueous solution can readily be adjusted by adding an alkali metal hydroxide or an aqueous solution of an alkali metal hydroxide thereto.

The foam can be contacted with the aqueous solution of the hypohalite at temperatures between about −10° C. and 120° C., but is usually carried out at from about room temperature up to about 80° C. and at atmospheric or substantially atmospheric pressure.

The hypohalite can be ued in a concentration of from about 0.1 percent by weight up to a saturated aqueous solution of the same, but is preferably employed as an aqueous solution containing from 2 to 10 percent by weight of the hypohalite, suitably the hypochlorite or the hypobromite, and having a pH value between 12 and 14.

The time for which the foam is treated or subjected to contact with the hypohalite solution will vary depending in part upon the concentration of the solution and in part upon the temperature, and in part upon the size of the cells in the foam being treated. It is understood, of course, that prolonged treatment of the urethane foam with the hypohalite may completely destroy the foam structure including the skeletal network of the cells. The invention contemplates the destroying of the membranes of the cell walls while retaining the skeletal network structure of the cells and without substantial deterioration of the latter. Some deterioration of the skeletal network occurs, but being of greater cross-section than the cell membranes the latter are destroyed before appreciable deterioration of the skeletal network occurs.

Soft low density and low compression load foams are readily prepared from flexible foams having small cells, e.g. from 45 to 60 or more cells per inch, which foams possess lower load bearing properties than have the flexible polyurethane foams heretofore available. These new low compression load foams are useful for a variety of purposes, e.g. as facial pads or cleansing pads. In general, the new foams have a softness corresponding to a compression load of from 0.1 to 0.10 lb./sq. in. for 25 percent compression as determined by procedure described in ASTM D-1564-59T, Method B.

It may be mentioned that where necessary, it is often advantageous to crush the urethane foam by squeezing it between rolls to rupture the cell walls of any closed cells, thereby making it easier for the hypohalite solution to penetrate and contact the cell membranes in the foam body.

Following the treating of the foam with the hypochlorite solution and the destroying of the cell membranes, the treated foam is washed with water or it may be treated with a swelling solvent such as a ketone or lower aliphatic alcohol, e.g. acetone, methyl ethyl ketone, methyl isobutyl ketone, methyl alcohol, isobutyl alcohol, ethyl alcohol, butyl alcohol, or mixtures of one or more of such ketones and/or alcohols and/or water, after which the foam product is washed with water and is dried.

The following examples illustrate ways in which the principle of the invention has been applied but are not to be construed as limiting its scope.

Example 1

(A) In each of a series of experiments, a flexible polyether urethane foam was prepared by reaction of tolylene diisocyanate with a polyol consisting of the adduct or condensation reaction product of propylene oxide with glycerine to form a polyether triol having an average molecular weight of about 3500, employing a recipe and procedure as follows:

| Ingredients | Parts by weight | | |
| --- | --- | --- | --- |
|  | A | B | C |
| Triol (mol. wt. 3,500) | 100 | 100 | 100 |
| Tolylene diisocyanate | 88.8 | 96.5 | 106.5 |
| Water | 3.5 | 4.0 | 4.5 |
| Triethylenediamine | 0.1 | 0.1 | 0.1 |
| Stannous octoate | 0.3 | 0.35 | 0.3 |
| Trichlorofluoromethane | 15 | 1.2 | 1.2 |
| Xylene | 3 | 0 | 0 |

In each of the experiments A, B and C, the ingredients were blended together in a mixing head in a one-shot process under a pressure of about 30 pounds per square inch gauge pressure and at room temperature. The resulting mixture was immediately discharged from the mixing head via a nozzle into an open mold wherein it was allowed to foam and was aged at room temperature for a period of 24 hours. In each experiment, a bun of foam having approximately the dimensions 36 x 36 x 24 inches thick was obtained. Test pieces, free of external skin, having the dimensions of 8 x 5 inches by one inch thick were cut from the foam bun. The foam was examined for size of the cells and for porosity. The cell size was determined by observing the surface of the foam under a magnifying glass and counting the number of cells per inch of length of the foam surface in two directions at right angles to one another. The number of cells per inch is reported as the average number of cells per inch as determined for the two measurements. The procedure for determining the porosity of the foam was to place a 1.5 inch diameter test piece of the foam one inch thick against a coarse screen in the end of a 1.5 inch internal diameter tube and pull air at room temperature through the test piece of foam by vacuum at a pressure differential of 1 inch of water, while measuring the rate of flow of air through the foam in cubic feet per minute. The foams were found to have a cell size and a porosity expressed as rate of flow of air in cubic feet per minute as follows:

|  | A | B | C |
| --- | --- | --- | --- |
| Cells, number per inch | 30 | 60 | 45 |
| Air flow, cu. ft./min | 4.85 | 1.88 | 2.96 |

(B) In each of a series of experiments, a test piece of the urethane foam having the dimensions of 8 x 5 inches by 1 inch thick was immersed in an aqueous one weight percent solution of sodium lauryl sulfate (wetting agent) then was removed and squeezed dry. The wetted foam was leached by placing it in an aqueous 5.25 weight percent solution of sodium hypochlorite, (NaOCl), made alkaline to a pH of 13.5 by adding sodium hydroxide thereto, and allowing it to soak in the solution at room temperature for a period of time as stated in the following table. At each of successive one hour intervals, during the leaching period, the foam was squeezed by hand and released, to flush the leach solution from the foam and allow a new portion of the solution to soak into the foam. At the end of the leaching period, the foam was removed from the solution and was squeezed dry, then was washed thoroughly with water and dried in air at room temperature. The leached foam was tested for porosity by measuring the rate of flow of air through a test piece of the foam employing procedure as previously described. Other pieces of the leached foam were tested to determine the physical properties of the foam. Table I identifies the experiments and gives the properties determined for the foam. For comparison, the properties of the starting foam are also reported in the table. Compression load was determined by procedure similar to that described in ASTM D-1564-59T Method B.

TABLE I

| Run No. | Number cells/in. | Leaching time, hrs. | Weight loss, percent | Air flow, cu. ft./min. | Tensile strength, lbs./sq. in. | Elongation, percent | Compression load, lbs./sq. in. |
| --- | --- | --- | --- | --- | --- | --- | --- |
| 1 | 30 |  |  | 4.85 | 8.1 | 110 | 0.202 |
| 2 |  | 6 | 15 | 9.18 | 10 | 208 | 0.134 |
| 3 | 45 |  |  | 2.96 | 20 | 220 | 0.44 |
| 4 |  | 18 | 39 | 6.45 | 22.1 | 430 | 0.109 |
| 5 | 60 |  |  | 1.88 | 20 | 185 | 0.5 |
| 6 |  | 16 | 56 | 4.97 | 7.6 | 275 | 0.026 |

Example 2

A flexible open cell polyether urethane foam similar to the foam A of Example 1, which foam had 40 cells per inch and a porosity corresponding to a rate of flow of 2.69 cu. ft./min. of air, was leached by soaking test pieces of the foam in an aqueous 4.75 weight percent solution of sodium hypobromite prepared by adding bromine to an aqueous solution of sodium hydroxide at 4° C. and in a molar ratio of sodium hydroxide of from 1.25:1 to 5:1 as stated in the following table. The test pieces of foam used in the experiments were discs of 1.5 inch diameter by 1 inch thick. They were suspended and stirred gently in 200 ml. of the aqueous alkaline sodium hypobromite solution at room temperature for a period of 6 hours. Table II identifies the experiments and gives the mole ratio of sodium hydroxide to bromine used in preparing the leach solution. The table also gives the porosity of the foam and the loss in weight.

TABLE II

| Run No. | Ratio NaOH/Br | Leach time, hrs. | Weight loss, percent | Air flow, cu. ft./min. |
| --- | --- | --- | --- | --- |
| 1 |  |  |  | 2.69 |
| 2 | 1.25 | 6 | 8 | 8.34 |
| 3 | 2.5 | 6 | 24.7 | 9.06 |
| 4 | 5.0 | 6 | 23.1 | 10.08 |

Example 3

A flexible open cell polyether urethane foam similar to the foam A of Example 1, which foam had 30 cells per inch and a porosity corresponding to a rate of flow of 4.17 cu.ft./min. of air. was leached by soaking test pieces of the foam in the form of discs of 1.5 inches diameter by 1 inch thick in an aqueous 5.25 weight percent solution of sodium hypochlorite at room temperature, which solution had a pH between 10 and 13.5. The pH of the solution was changed by adding aqueous hydrochloric acid or aqueous sodium hydroxide thereto. The test pieces of the foam were suspended in 200 ml. of the aqueous solution having the stated pH value and were gently agitated for a period of 4.5 hours. Thereafter, the foam was removed from the solution, was squeezed dry and was thoroughly washed with water and was dried. The leached foam was tested for change in weight, per cent chlorine and porosity or breathabliity expressed as the rate of flow of air therethrough. Table III identifies the experiments and gives the properties determined for the foam.

TABLE III

| Run No. | Leach solution, pH | Leach time, hrs. | Weight loss, percent | Chlorine, percent | Air flow, cu. ft./min. |
|---|---|---|---|---|---|
| 1 | 13.5 | 4.5 | 14.1 | 0 | 10.6 |
| 2 | 13 | 4.5 | 13.4 | 0 | 9.8 |
| 3 | 12 | 4.5 | 7.1 | 0.66 | 9.5 |
| 4 | 11 | 4.5 | 4.67 | 2.7 | 11.03 |
| 5 | 10 | 4.5 | ¹0.75 | 5.6 | 10.75 |
| 6 | | | | | 4.17 |

¹ Gain in weight.

Example 4

In each of a series of experiments, a test piece of a flexible open cell polyurethane foam having 30 cells per inch and a porosity corresponding to a rate of flow of 4.17 cu. ft./min. of air, was leached by suspending it in an aqueous 5.25 weight percent solution of sodium hypochlorite made alkaline to a pH of 13 with sodium hydroxide, for a period of time and at a temperature as stated in the following table. Thereafter, the foam was removed from the solution and was thoroughly washed with water and was dried. Table IV identifies the experiements and gives the time, temperature of the leaching conditions employed. The table also gives the loss in weight of the foam and the porosity of the leached foam.

TABLE IV

| Run No. | Leaching temperature, °C. | Leaching time, hrs. | Weight loss, Percent | Air flow cu.ft./min. |
|---|---|---|---|---|
| 1 | 2 | 6.5 | 2.38 | 8.98 |
| 2 | 2 | 24 | 8.86 | 9.42 |
| 3 | 2 | 48 | 14.6 | 10.6 |
| 4 | 25 | 20 | 36.6 | 11.85 |
| 5 | 60 | 2 | 26.8 | 10.85 |
| 6 | 60 | 1 | 16.8 | 9.85 |
| 7 | 60 | ¹15 | 7.42 | 9.45 |
| 8 | 60 | ¹5 | 2.07 | 8.91 |
| 9 | 96 | 3 | 57.7 | 12.5 |
| 10 | 96 | 1 | 34.4 | 12.1 |
| 11 | 96 | ¹15 | 19.6 | 10.5 |
| 12 | 96 | ¹5 | 11.4 | 9.45 |

¹ Minutes.

Example 5

In each of a series of experiments, test pieces of flexible open cell polyurethane having 30 cells to the inch and a porosity of 4.17 cu. ft./min. of air, similar to that employed in Example 3 was leached by suspending the same in an aqueous solution of an inorganic hypohalite in a concentration and at a pH as stated in the following table, and for a time at room temperature as stated in said table. Thereafter, the foam was removed from the solution and was thoroughly washed with water and was dried. Table V identifies the experiments and gives the porosity of the leached foam.

TABLE V

| Run No. | Agent, kind | Conc., percent | pH | Time, hrs. | Weight loss, percent | Air flow, cu. ft./min. |
|---|---|---|---|---|---|---|
| 1 | Ca(OCl)₂ | 5 | 12 | 5 | 3.97 | 8.74 |
| 2 | Mg(OCl)₂ | 4.45 | 9.1 | 1 | ¹6.25 | 8.6 |
| 3 | KOCl | 6.4 | 13.6 | 3 | 4.4 | 9.0 |
| 4 | KOCl | 6.4 | 13.6 | 6 | 5.8 | 9.3 |
| 5 | LiOCl | 4.1 | 12 | 3 | 5.14 | 7.94 |
| 6 | LiOCl | 4.1 | 12 | 6 | 6.65 | 8.6 |
| 7 | NaOCl | 5.2 | 13 | 3 | 5.26 | 8.09 |
| 8 | NaOCl | 5.2 | 13 | 6 | 9.12 | 8.34 |
| 9 | NaOCl | 20.8 | 13.5 | 3 | 13.35 | 8.74 |
| 10 | NaOI | 4 | 13 | 48 | | 6.34 |

¹ Gain in weight.

Example 6

In each of a series of experiments, an open cell flexible polyurethane foam prepared by reaction of tolylene diisocyanate with a polyether polyol as stated in the following table, employing a recipe and procedure similar to those employed in Example 1, which polyurethane foam had a density in pounds per cubic foot of the foam, a porosity corresponding to a rate of flow of air therethrough and a number of cells per inch as stated in the following table, was treated with an aqueous 5.25 weight percent solution of sodium hypochlorite solution having a pH of 13 for a period of 20 hours, after which the treated foam was removed from the solution, was washed with water and was dried. The treated polyurethane foam was tested for porosity employing procedure similar to that employed in Example 1. Table IV identifies the experiments and gives the density, the pore or cell size and the porosity of the foam starting material. The table also gives the porosity or breathability of the leached or treated polyurethane foam.

TABLE VI

| | | Starting foam | | | Treated foam | |
|---|---|---|---|---|---|---|
| Run No. | Polyether polyol starting material, kind | Density, lbs./cu.ft. | Number of cells per inch | Air flow, cu.ft./min. | Loss in weight, percent | Air flow, cu.ft./min. |
| 1 | Glycerine+propylene oxide, end capped with ethylene oxide (OH eq. wt.=1,000). | 2.5 | 50 | 0.27 | 34.6 | 4.72 |
| 2 | Poly(1,2-butylene glycol), mol. wt. 2,000 | 4 | 50 | 0.81 | 3.5 | 5.0 |
| 3 | Polypropylene glycol, average mol. wt. 4,000 | 4 | 45 | 1.75 | 8.5 | 2.64 |
| 4 | Trimethylolpropane+propylene oxide, average mol. wt. 4,500. | 4 | 60 | 1.75 | 41 | 5.80 |
| 5 | Glycerine+propylene oxide, mol. wt. 3,000 | 3 | 50 | 0.27 | 13 | 2.42 |

Example 7

In each of a series of experiments, a weighed test piece of a leached polyurethane foam having a porosity as stated in the following table, and having the dimensions of a 1.5 inch diameter disc by 1 inch thick was placed over a 1.5 inch diameter outlet to a vessel containing a quantity of stirred talc. A stream of air was pulled through the vessel and through the test piece of foam at a flow rate of 5 cu. ft./min. by vacuum, while rotating an agitator in the vessel to stir the talc so that particles of the talc were carried in the air stream that was discharged through the test piece of the foam, for a period of 1 hour. Thereafter, the foam was reweighed and the weight of talc in grams picked up by the foam was determined. No particles of talc passed through the test pieces of foam. Table VII identifies the experiments and gives the porosity of the leached foam expressed as the rate of flow of air therethrough in cubic feet per minute at 1 inch of water differential pressure. The table also gives the weight in grams of talc picked up by the test piece of foam. The results were as follows:

TABLE VII

| Run No. | Air flow, cu. ft./min. | Talc Pick-up, gms. |
|---|---|---|
| 1 | 8.75 | 316 |
| 2 | 9.85 | 665 |
| 3 | 8.08 | 248 |
| 4 | 10.2 | 1,215 |

We claim:

1. A method for making an open cell polyurethane product which comprises contacting a flexible polyether polyurethane foam prepared by reaction of a polyether polyol consisting predominantly of chemically combined alkylene oxide units having from 3 to 4 carbon atoms and having a molecular weight between about 1800 and 5800 and containing from 2 to 3 hydroxyl groups in the molecule, and a polyisocyanate, with a liquid aqueous basic solution having a concentration between about 0.1 weight percent and a saturated solution of a hypohalite selected from the group consisting of the alkali metal hypohalites and the alkaline earth metal hypohalites, at temperatures between −10° and 120° C. for a time sufficient to appreciably increase the porosity of the foam by destroying membranes of the cells while leaving largely a skeletal network of the foam structure.

2. A method as claimed in process claim 1, wherein the polyisocyanate is toluene diisocyanate.

3. A method as claimed in claim 1, wherein the hypohalite is an alkali metal hypohalite.

4. A method as claimed in claim 1, wherein the hypohalite is an alkaline earth metal hypohalite.

5. A method as claimed in claim 1 wherein the hypochlorite solution has a pH value between 12 and 14.

6. A method as claimed in claim 3 wherein the hypohalite is sodium hypochlorite.

7. A method as claimed in claim 3, wherein the hypohalite is sodium hypobromite.

8. A method as claimed in claim 4 wherein the hypohalite is calcium hypochlorite.

References Cited

UNITED STATES PATENTS

| 3,125,541 | 3/1964 | Hwa et al. | 260—2.5 |
| 3,171,820 | 3/1965 | Volz | 260—2.5 |
| 3,175,030 | 3/1965 | Geen | 264—321 |

FOREIGN PATENTS 543,363  12/1954  Belgium.

DONALD E. CZAJA, *Primary Examiner.*

H. S. COCKERAM, *Assistant Examiner.*